Patented Feb. 16, 1943

2,311,086

UNITED STATES PATENT OFFICE 2,311,086

METHOD OF PREPARING PHOTOGRAPHIC PRODUCTS FROM COMPOSITIONS CONTAINING FAR-HYDROLYZED CELLULOSE ESTERS

Martin Salo, Rochester, N. Y., assignor to Eastman Kodak Company, Rochester, N. Y., a corporation of New Jersey No Drawing. Application November 1, 1941, Serial No. 417,522

3 Claims. (Cl. 117—34)

This invention relates to a method of setting photographic emulsions containing far-hydrolyzed cellulose esters as a carrier therein by treating them with methyl alcohol.

Photographic emulsions in which far-hydrolyzed cellulose esters have been employed as a carrier or protective colloid therein have been described in my U. S. Patent 2,110,491, dated March 8, 1938, and in British Patent No. 496,049 of Groves. Those patents point out the objectionable features of gelatine emulsions which are avoided by the use of far-hydrolyzed cellulose esters.

The far-hydrolyzed cellulose esters which are useful as carriers for light sensitive substances in photographic layers are usually coated from solvent mixtures of large amounts of water with water-miscible compounds. Because in curing these layers it is necessary to remove the large amount of water present therein, layers of photosensitive emulsions using a far-hydrolyzed cellulose ester as the carrier have had a tendency to cure very slowly.

One object of my invention is to provide a method of curing photographic emulsion layers, in which far-hydrolyzed cellulose esters are employed as carriers, which takes much less time than was formerly thought necessary. Other objects will appear herein.

I have found that immersion of a freshly coated photosensitive emulsion having a far-hydrolyzed cellulose ester carrier, in a bath of methyl alcohol coagulates or sets the emulsion layer and leaches out a large proportion of the coating solvent, which is replaced at least to some extent by the methyl alcohol. Other water soluble alcohols, as ethyl, propyl, isopropyl, or tertiary butyl alcohols, when used in the same way, tend to dissolve rather than coagulate the cellulose ester emulsion. I have found that a cellulose ester emulsion coating so-treated dries rapidly and readily in the air at room temperature because it has set and contains a preponderant amount of the low-boiling methyl alcohol.

Photographic emulsions are coated on to various types of support such as paper, glass or film base, the latter usually being of a lower fatty acid ester of cellulose such as cellulose acetate. Any of the photographic products prepared by coating a cellulose ester emulsion thereon may be cured by my process providing the support is not softened or dissolved by the methyl alcohol. For instance some types of cellulose nitrate support are affected by methyl alcohol and because of this it would ordinarily not be advisable to use that support in conjunction with my process.

It is preferable in my process to employ methyl alcohol having little or no water present therein especially if rapidity of curing the emulsion layer is desired. If however the primary interest is the setting of the emulsion a more aqueous methyl alcohol may be employed. Even in this case more rapid curing of the emulsion layer will ordinarily be experienced. It is also desirable that the methyl alcohol be free of an amount of solvent which would impart solvent tendencies to the methyl alcohol for either the cellulose ester in the emulsion or the film base which is employed as a support for the emulsion layer. The methyl alcohol may be synthetic methanol, that obtained from wood distillation processes, or any other source of obtaining this material providing it has the character specified.

The time of immersion of the emulsion layer in the methyl alcohol need only be a few seconds, although a longer time of treatment is not objectionable. A convenient method of employing my process is to lead the support in continuous form after it has been coated with the emulsion layer through a bath of methyl alcohol from which it may be passed either through a drying chamber, or into the air at room temperature where it dries quickly.

The emulsions which are susceptible to treatment by my process are those in which far-hydrolyzed lower fatty acid esters of cellulose are employed as the protective colloid for the photosensitive material usually silver halide, all as described in greater detail in my Patent No. 2,110,491. Some of the most useful cellulose esters for use in photographic emulsions are the cellulose acetates having an acetyl content of 20–25%. These emulsions are coated from solvent mixtures consisting of large amounts of water and water-miscible compounds such as methyl acetate, ethyl alcohol, n-propyl alcohol, β-methoxy ethyl alcohol, acetone or the like. Far hydrolyzed cellulose acetate propionates and cellulose acetate-butyrates have also been employed for photographic emulsions and are also susceptible to setting and rapid curing by means of my invention.

The following example illustrates my invention:

A photographic emulsion was prepared by first dissolving 40 gms. of a far-hydrolyzed cellulose acetate having an acetyl content of 25% in 470 gms. of a mixture of 3 parts by weight of ethyl lactate and 2 parts of water. 6.5 gms. of potassium bromide dissolved in 32 gms. of ethyl lactate—water was stirred in following which 8.5 gms. of silver nitrate in solution in 20 gms. of ethyl lactate—water (1:1 by weight) was stirred in, in the dark and the mass was then diluted with 110 gms. of 1:1 ethyl lactate—water containing 9.4 gms. of cellulose acetate dissolved therein.

The diluted photographic emulsion was coated on to glass plates using a coating knife having a clearance of .015 inch. Immediately after coating the plates were immersed in methanol which caused almost immediate setting of the coating forming a smooth brilliant layer. The plates dried quickly at room temperature.

It is to be understood that the term "immersion" as used herein means any type of treatment of the emulsion layer with liquid methyl alcohol. For instance the methyl alcohol may be sprayed on, or flowed over the emulsion layer if this method of treatment is desired.

I claim:
1. A method of treating a photographic emulsion containing a far-hydrolyzed cellulose ester as the protective colloid, after it has been coated out in the form of a layer upon a support therefor, which comprises immersing the emulsion layer in methyl alcohol.
2. A method of treating a freshly coated layer of a photographic emulsion containing a far-hydrolyzed cellulose acetate as the carrier for the photosensitive element therein, which comprises treating the emulsion layer with methyl alcohol.
3. A method of treating a freshly coated layer of a photographic emulsion containing a far-hydrolyzed cellulose acetate propionate as the carrier for the photosensitive element therein, which comprises treating the emulsion layer with methyl alcohol.

MARTIN SALO.